W. H. COOLEY.
MACHINE FOR CUTTING AND CORRUGATING SHEET METAL.
APPLICATION FILED SEPT. 8, 1908.
909,066.
Patented Jan. 5, 1909.
4 SHEETS—SHEET 1.
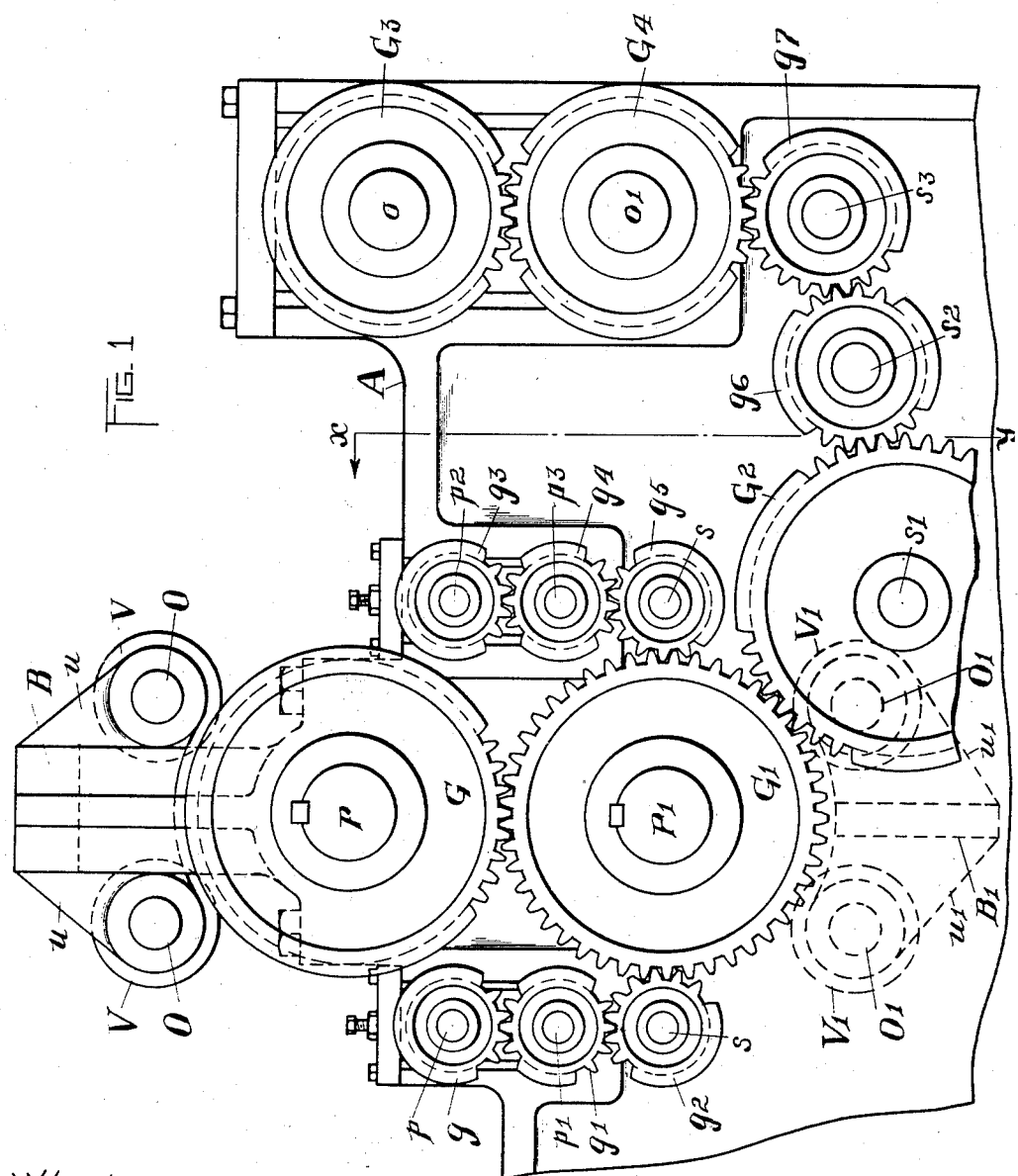
WITNESSES:
INVENTOR:
W. H. Cooley.

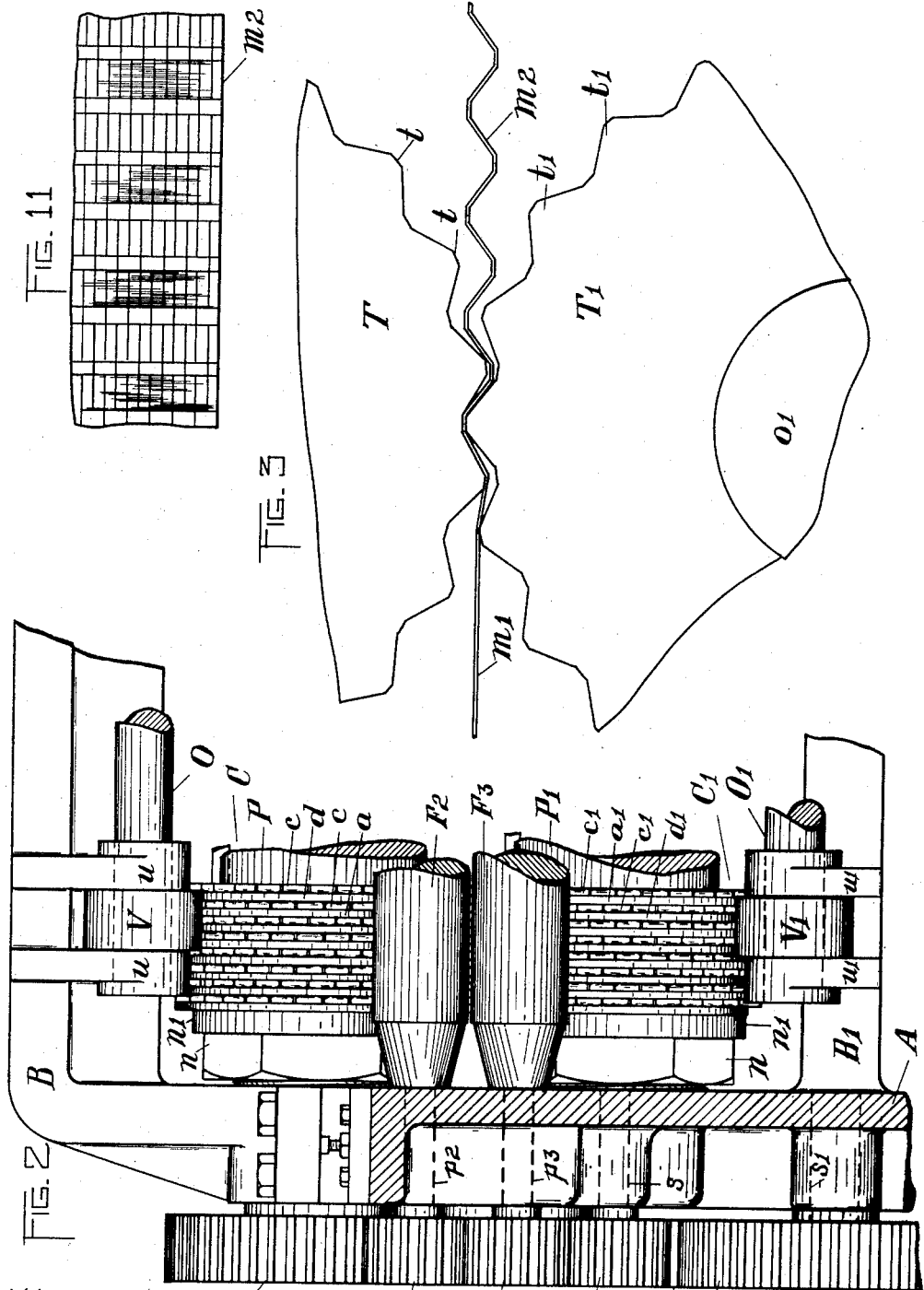

W. H. COOLEY.
MACHINE FOR CUTTING AND CORRUGATING SHEET METAL.
APPLICATION FILED SEPT. 8, 1908.
909,066.
Patented Jan. 5, 1909.
4 SHEETS—SHEET 3.
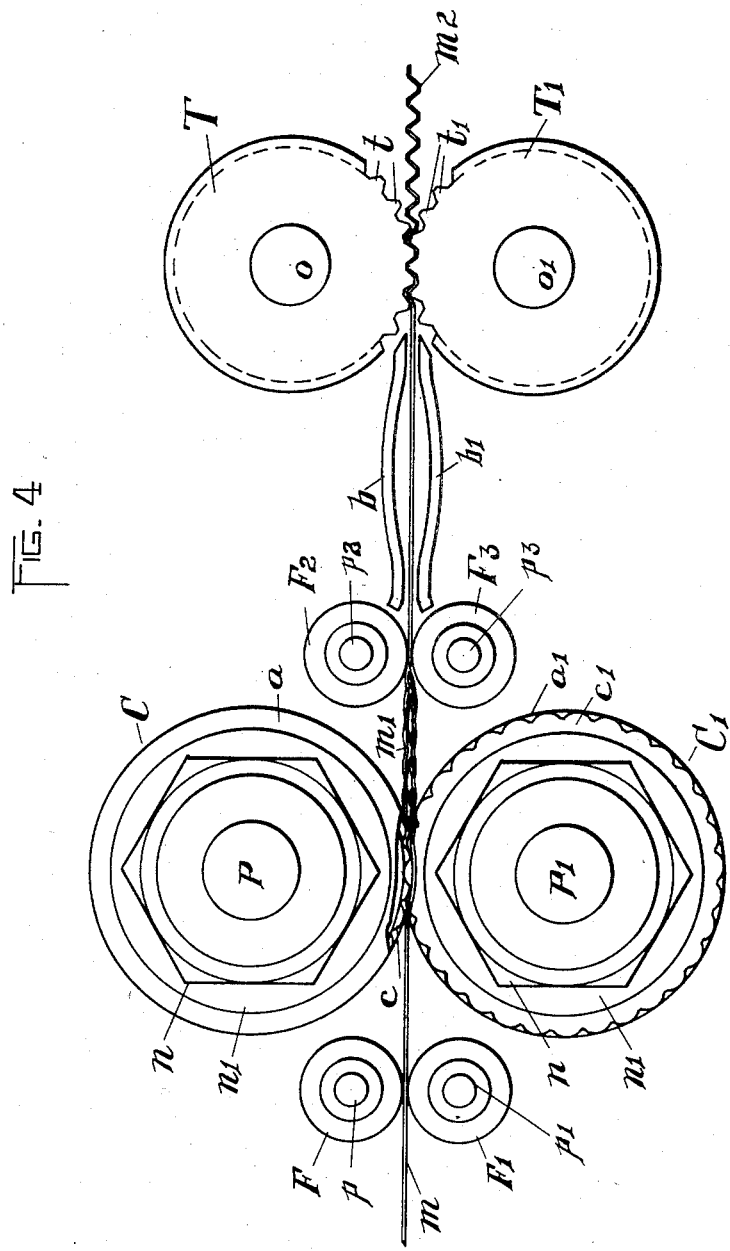

W. H. COOLEY.
MACHINE FOR CUTTING AND CORRUGATING SHEET METAL.
APPLICATION FILED SEPT. 8, 1908.
909,066.
Patented Jan. 5, 1909.
4 SHEETS—SHEET 4.
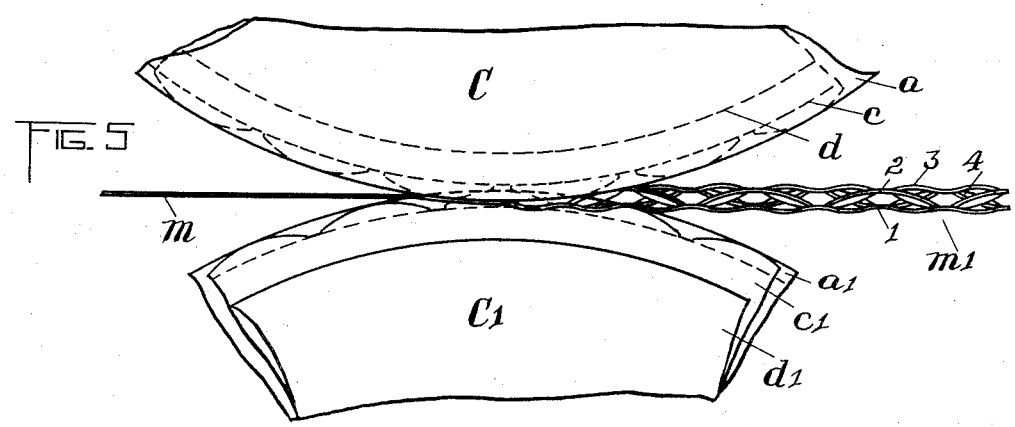
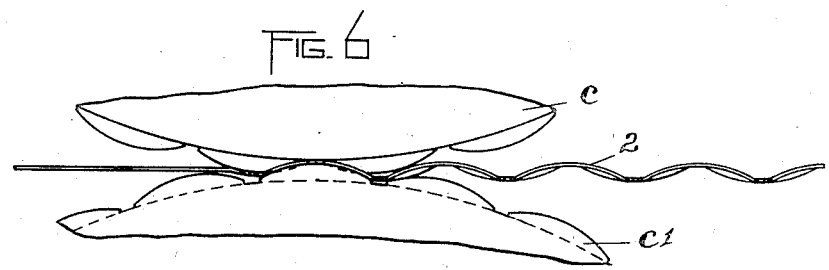
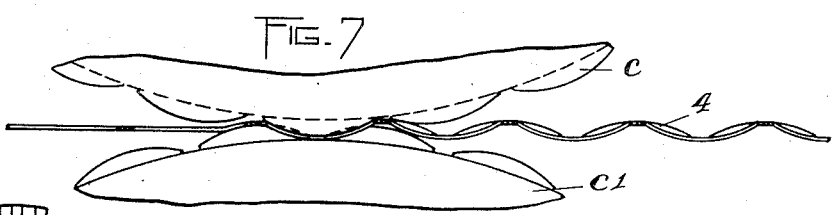
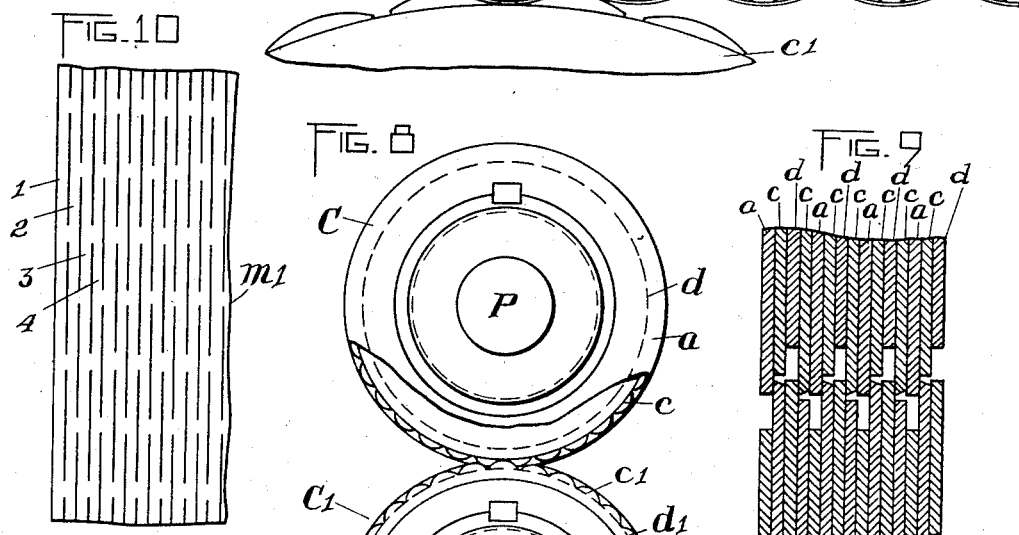

UNITED STATES PATENT OFFICE.

WILLIAM H. COOLEY, OF BROCKPORT, NEW YORK.

MACHINE FOR CUTTING AND CORRUGATING SHEET METAL.

No. 909,066.　　　　Specification of Letters Patent.　　　　Patented Jan. 5, 1909.

Application filed September 8, 1908. Serial No. 452,000.

*To all whom it may concern:*

Be it known that I, WILLIAM H. COOLEY, a citizen of the United States, and a resident of Brockport, in the county of Monroe and State of New York, have invented a new and Improved Machine for Cutting and Corrugating Sheet Metal, of which the following is a specification.

This invention relates to machines for cutting sheet metal preparatory to expanding the same, and embodies also a corrugating mechanism, whereby the cut and corrugated sheet may be expanded by mechanism engaging the keys or bonds and drawing such keys or bonds in straight lines for the purpose of simplifying the expanding process.

In accordance with my method of producing expanded sheet metal, inasmuch as the expansion is effected by drawing the bonds or keys of the cut metal in parallel lines transverse to the direction of the feed of the metal through the cutters, it is necessary that the expanding process be effected by an apparatus or machine separate from the cutting mechanism, and in order to reduce to the minimum the number of interruptions in the operation of the expanding mechanism for the production of a given quantity of metal, it is important that the sheets be as wide as practical transversely of the direction of the cuts and of the feed through the cutters. This necessitates cutting rolls of considerable length which, unless sustained at points between their bearings, would be apt to spring if made of reasonably moderate size. I prefer to make such cutting rolls of moderate size and to support them by sustaining rollers adapted to bear upon and support the cutting rollers at points between their bearings. In the use of such sustaining rollers it is important that the extreme outer peripheries of the cutting rollers be complete and uninterrupted cylindrical surfaces. For that reason I have devised special cutting rollers built up in sections, in which the outer peripheries of the disks composing the completed cutting rollers present a series of uninterrupted cylindrical surfaces. I have found that only one pair of such coöperating cutting rollers is necessary.

In practicing my process or method of forming expanded metal, in order that the cut or slashed sheet metal may be engaged at the keys or bonds and such bonds drawn in straight lines, in accordance with my present invention, I make use of rollers to form corrugations in the cut metal extending in directions transversely of the direction of the cuts and of the feed through the cutters, such corrugating rollers positively driven with the cutting rollers and at such a rate of speed as to coöperate therewith and with the rollers for feeding the metal thereto and therefrom.

The accompanying drawings show only such parts of a machine embodying my invention for cutting and corrugating sheet metal as are necessary to illustrate my invention and, so far as possible, unimportant parts are omitted and other parts are shown diagrammatically. Such drawings are as follows:—

Figure 1 is a side view of a part of the machine. Fig. 2 is a sectional view of a part of the machine taken along the line $x$—$y$ of Fig. 1, looking in the direction of the arrow. Fig. 3 shows coöperating segments of the corrugating rolls. Fig. 4 shows diagrammatically the arrangement of the feed rolls, cutting rolls and corrugating rolls. Fig. 5 shows a portion of the cutting rolls and a strip of metal as passing therethrough and being acted on thereby. Figs. 6 and 7 show in views similar to Fig. 5 the action of different cutters upon the metal. Fig. 8 is an end view of the cutting rolls with parts of the same broken away. Fig. 9 is a vertical central section of the lower portion of a part of the upper cutting roll and the upper portion of a part of the lower cutting roll. Fig. 10 shows diagrammatically a strip of the metal as cut before being corrugated, while Fig. 11 shows this same strip of metal after it has been corrugated.

Similar letters refer to similar parts throughout the several views, in which Figs. 3, 5, 6, 7, 9, 10 and 11 are drawn to a larger scale than Figs. 1, 2, 4 and 8.

Referring to the drawings,—a machine embodying my invention may have side frame pieces A, each of which may have suitable supporting members, not shown, and they may be properly connected together by means of cross pieces also not shown. Each side member A carries bearings for shafts P, P$^1$, $p$, $p^1$, $p^2$, $p^3$, $o$ and $o^1$. On the shafts P and P$^1$ are assembled the cutting disks to form the cutting rollers C and C$^1$ located between the side members A, 11 while outside of such side members A there are secured on these shafts P and P¹ the intermeshing gears G and G¹. The gear G¹ meshes with spur gears $g^2$ and $g^5$ revolubly supported on studs $s$ extending outwardly from and secured in the side member A. These gears $g^2$ and $g^5$ mesh respectively with the gears $g^1$ and $g^4$ secured on the shafts $p^1$ and $p^3$, while such gears $g^1$ and $g^4$ mesh respectively with the gears $g$ and $g^3$ secured on the shafts $p$ and $p^2$. On the shafts $p^2$ and $p^3$ are rigidly secured the feed rolls F² and F³, as seen in Fig. 2. Similar feed rolls F and F¹ are secured on the shafts $p$ and $p^1$ to constitute another set of coacting feed rolls, which, by means of the gearing connections just above described, are driven from the gear G¹. On the shafts $o$ and $o^1$ are secured respectively the upper and lower corrugating rolls T and T¹ located between the sides of the machine, while on the side of the machine towards the observer there are secured on such shafts $o$ and $o^1$ intermeshing gears G³ and G⁴ respectively. The gear G⁴ is driven from the gear G¹ by the intermediate gear wheels G², $g^6$ and $g^7$ revolubly supported respectively on the studs $s^1$, $s^2$ and $s^3$.

The machine may be operatively driven by power applied to either of the shafts P or P¹. The gear connections between the several co-acting revoluble parts thus far described are such as to cause the proper relative rotations thereof to secure the coöperations hereinafter described.

The sheet of metal $m$ to be cut and corrugated is fed from left to right through the machine and engaged first by the feed rollers F and F¹ and advanced thereby into engagement with the cutting rolls C and C¹, the construction of which will be described later, and from such cutting rolls, as seen at $m^1$ in Fig. 4, it advances between the feed rollers F² and F³, by means of which it is flattened out and then advanced between the upper and lower guide plates $b$ and $b^1$, by means of which it is guided into proper engagement with and between the corrugating rollers T and T¹, operating to corrugate the metal transversely of the direction of its feed through the machine and of the direction of the cuts in such a way that a longitudinal section thereof will conform to the side bars lying between two adjacent and correspondingly disposed series of meshes in the expanded metal. The corrugating rolls T and T¹ are so proportioned and spaced relatively to the cutting rolls and the rate of rotation of such corrugating rolls T and T¹ is also such that the crests of the corrugations formed thereby are arranged along and in the lines of the keys or bonds connecting the bars in the expanded metal.

The cutting rollers C and C¹, as indicated in Figs. 5, 6, 7, 8 and 9, to which reference is now made, are built up of cutting disks arranged and coöperating as follows:—Starting at the end of the rollers towards the observer in Figs. 1 and 4, being the left hand end in Figs. 2 and 9, the upper roller comprises a series of plain disks $a$ spaced apart by a distance equaling substantially thrice their thickness. The lower roller comprises similarly a series of plain disks $a^1$ spaced apart by substantially a distance equaling thrice their thickness. Between each two adjacent disks $a$ are located, starting at the left, first a cutter $c$ and then a spacing disk $d$ and then another cutter $c$, while similarly between each two adjacent disks $a^1$ are located, first a cutter $c^1$ and then a spacing disk $d^1$ and then a cutter $c^1$, these disks and cutters being so spaced and located on their respective shafts that two cutter disks on one shaft with a plain disk between them engage between two plain disks on the other shaft, and opposite each plain disk on one shaft is located a spacing disk on the other shaft. The plain disks are of such a diameter that they overlap each other at their peripheries by substantially just twice that amount which the metal is to be displaced from the initial plane thereof at the deepest points in the cuts, as indicated in Fig. 5.

The diameter of the cutter disks $c$ and $c^1$ at their outermost points is substantially the same as that of the plain disks $a$ and $a^1$. The cutter disks $c$ and $c^1$ are so arranged angularly that the maximum diameter of a cutter $c$ comes opposite a point midway between two adjacent points of maximum diameter in the cutters $c^1$ and vice versa. There is, however, left between the two oppositely positioned cutters $c$ and $c^1$ a space amply sufficient for the free passage between them of the metal $m$. The cutting projections on the cutters $c$ and $c^1$ may be arranged and conformed substantially as shown in Figs. 5, 6 and 7. The cutter disks of one cutting roller shear or cut the metal against the adjacent edge and face of a plain disk in the other roller. The result of this arrangement is that the cutters $c$ and $c^1$ coöperating with the plain disks $a^1$ and $a$ respectively cut the metal in the manner clearly indicated in Figs. 5, 6, 7 and 10 and more fully described as follows:—The plain disks $a$ force downwardly from the initial plane of the metal strips 1, the width of each of which is substantially the thickness of such plain disks and the plain disks $a^1$ force upwardly from the initial plane of the metal strips 3, the width of each of which is substantially the thickness of such plain disks $a^1$ and between each such strips of the metal forced downwardly below its initial plane and the adjacent strips forced upwardly from the initial plane of the metal there are formed a series of connecting bars 2 and 4 joined to the upper strip and to the lower strip at points denominated keys or bonds in the cut and expanded metal. Each coöperating pair of cutters c and $c^1$ are arranged to leave uncut portions or bonds in the metal between or opposite the centers of the cuts formed by an adjacent coöperating pair of such cutters, as indicated diagrammatically in Fig. 10. The result of this is that there is formed in the cut metal series of strips 1 extending continuously below the initial plane of the metal and series of strips 3 extending continuously above the initial plane of the metal and such strips extending continuously above are connected to those strips extending continuously below by intermediate strips 2 and 4 of equal width connected to such first named strips at alternating points, as indicated in edge view in Fig. 5.

The metal as it leaves the cutting rolls passes through the feed rolls F and $F^1$ and between two guide bars $b$ and $b^1$ and is engaged by the corrugating rolls T and $T^1$, which bend the metal to and fro, as indicated at $m^2$ in Figs. 3, 4 and 11, the crest of each corrugation being flattened and extending along the lines of the keys or bonds in such a way that adjacent transversely arranged rows of keys or bonds are forced in opposite directions. The assembled disks comprising the cutting rolls are held in place by nuts $n$ engaging against collars $n^1$.

At the top of the machine is seen a cross piece B and between the side members is seen a cross piece $B^1$. The cross piece B carries thereon brackets $u$ extending both forwardly and to the rear therefrom to constitute bearings for the shafts O having thereon rollers V engaging against the plain disks $a$ in such a way as to sustain and support the upper cutting roller C to prevent the same from being forced upwardly by the thrust exerted thereon in cutting the metal. Similarly, the connecting piece $B^1$ carries arms $u^1$ forming bearings for the shafts $O^1$ having thereon rollers $V^1$ which similarly engage against the plain disks $a^1$ on the lower cutting roller $C^1$.

Attention is especially called to the fact that in the metal as it leaves the cutting mechanism, the strips between the series of interrupted cuts are bent or forced from the original plane of the metal in such a way that the sheet is so shortened in the direction of the cuts that it may, at this stage, be expanded by engaging the sheet at the keys and drawing the keys in straight lines transversely of the cuts. For the purpose of my present invention, however, I prefer to corrugate the sheet in the manner described, and before corrugating it, to flatten it out in order that the sheet may be more readily and satisfactorily corrugated, as the expanding apparatus may be made of a preferred form when the metal is thus corrugated before it is expanded, although for expanding the metal as it leaves the cutters a modified form of the expanding machine which I make use of may be employed.

What I claim is:—

1. In a machine for the purpose described, two coöperating cutting rollers having cutting members adapted to form series of alternatingly interrupted cuts spaced apart the distance equaling the width of a bar in the expanded metal, such cutters adapted in forming such cuts to bend all the strips of the sheet extending longitudinally of and between the series of cuts to uniformly shorten the sheet in the direction of the cuts to permit the expansion of the sheet in a transverse direction without a further shortening thereof.

2. In a machine for the purpose described, two coöperating cutting rollers having cutting members adapted to form series of alternatingly interrupted cuts spaced apart the distance equaling the width of a bar in the expanded metal, such cutters adapted in forming such cuts to bend all the strips of the sheet extending longitudinally of and between the series of cuts away from the original plane of the sheet to uniformly shorten the sheet in the direction of the cuts to permit the expansion of the sheet in a transverse direction without a further shortening thereof.

3. In a machine for the purpose described, two coöperating cutting rollers having cutting members adapted to form series of alternatingly interrupted cuts spaced apart the distance equaling the width of a bar in the expanded metal, such cutters adapted in forming such cuts to force adjacent keys in rows transverse to the direction of the cuts in opposite directions to shorten the sheet in the direction of the cuts to permit the expansion of the sheet in a transverse direction without a further shortening thereof.

4. In a machine for the purpose described, two coöperating cutting rollers having cutting members adapted to for mseries of alternatingly interrupted cuts spaced apart the distance equaling the width of a bar in the expanded metal, such cutters adapted in forming such cuts to bend all the strips of the sheet extending longitudinally of and between the series of cuts to uniformly shorten the sheet in the direction of the cuts to permit the expansion of the sheet in a transverse direction without a further shortening thereof, such cutting rollers comprising plain and notched disks and spacing disks, the points of maximum diameter of such cutting rolls comprising such plain disks and coöperating supporting or bracing rollers, adapted to make rolling engagement with such plain disks on such cutting rolls.

5. In a machine for the purpose described, two coöperating cutting rollers having cutting members adapted to form series of alternatingly interrupted cuts spaced apart the distance equaling the width of a bar in the expanded metal, such cutters adapted in forming such cuts to bend all the strips of the sheet extending longitudinally of and between the series of cuts away from the original plane of the sheet to uniformly shorten the sheet in the direction of the cuts to permit the expansion of the sheet in a transverse direction without a further shortening thereof, such cutting rollers comprising plain and notched disks and spacing disks, the points of maximum diameter of such cutting rolls comprising such plain disks and coöperating supporting or bracing rollers adapted to make rolling engagement with such plain disks on such cutting rolls.

6. In a machine for the purpose described, two coöperating cutting rollers having cutting members adapted to form series of alternatingly interrupted cuts spaced apart the distance equaling the width of a bar in the expanded metal, such cutters adapted in forming such cuts to force adjacent keys in rows transverse to the direction of the cuts in opposite directions to shorten the sheet in the direction of the cuts to permit the expansion of the sheet in a transverse direction without a further shortening thereof, such cutting rollers comprising plain and notched disks and spacing disks, the points of maximum diameter of such cutting rolls comprising such plain disks and coöperating supporting or bracing rollers adapted to make rolling engagement with such plain disks on such cutting rolls.

7. In a machine for the purpose described, two coöperating cutting rollers adapted to form in the sheet series of alternatingly interrupted cuts and coöperating corrugating rollers adapted to form in the sheet corrugations extending transversely of the direction of the cuts and with the maximum depth of such corrugations at the rows of keys between the interrupted cuts, such corrugations operating to uniformly shorten the sheet in the direction of the cuts to permit the expansion of the sheet in a transverse direction without a further shortening of the sheet and without stretching the metal in such expanding operation.

8. In a machine for the purpose described, two coöperating cutting rollers adapted to form in the sheet series of alternatingly interrupted cuts; coöperating corrugating rollers adapted to form in the sheet corrugations extending transversely of the direction of the cuts and with the maximum depth of such corrugations at the rows of keys between the interrupted cuts, such corrugations operating to shorten the sheet in the direction of the cuts to permit the expansion of the sheet in a transverse direction without a further shortening of the sheet and without stretching the metal, and rollers adapted to flatten out the metal located between such cutting and corrugating rolls.

9. In a machine for the purpose described, two coöperating cutting rollers adapted to form in the sheet series of alternatingly interrupted cuts and coöperating corrugating rollers adapted to form in the sheet corrugations extending transversely of the directions of the cuts and with the maximum depth of such corrugations at the rows of keys between the interrupted cuts, such corrugations conforming substantially to the contour of a series of bars and their connecting keys between two adjacent transversely arranged series of meshes in the expanded metal.

10. In a machine for the purpose described, two coöperating cutting rollers adapted to form in the sheet series of alternatingly interrupted cuts; coöperating corrugating rollers adapted to form in the sheet corrugations extending transversely of the direction of the cuts and with the maximum depth of such corrugations at the rows of keys between the interrupted cuts, such corrugations conforming substantially to the contour of a series of bars and their connecting keys between two transversely arranged series of meshes in the expanded metal and rollers adapted to flatten out the metal located between such cutting and corrugating rolls.

11. In a machine for the purpose described, two coöperating cutting rollers having cutting members adapted to form series of alternatingly interrupted cuts spaced apart the distance equaling the width of a bar in the expanded metal such cutters adapted to force continuously in one direction away from the initial plane of the sheet longitudinally extending strips between the cuts spaced apart by three intermediate strips and to force the centrally disposed one of each such three intermediate strips continuously in the opposite direction away from the initial plane of the sheet and to force the adjacent strips on each side of each such centrally disposed intermediate strip obliquely across the initial plane of the sheet between their alternating connections at the keys to strips on each side thereof forced continuously in opposite directions away from the initial plane of the sheet.

12. In a machine for the purpose described, two coöperating cutting rollers having cutting members adapted to form series of alternatingly interrupted cuts spaced apart the distance equaling the width of a bar in the expanded metal, such cutters adapted to force continuously in one direction away from the initial plane of the sheet longitudinally extending strips between the cuts spaced apart by three intermediate strips and to force the centrally disposed one of each such three intermediate strips continuously in the opposite direction away from the initial plane of the sheet and to force the adjacent strips on each side of each such centrally disposed intermediate strip obliquely across the initial plane of the sheet between their alternating connections at the keys to strips on each side thereof forced continuously in opposite directions from the initial plane of the sheet, the obliquely extending connecting strips on one side of each such centrally disposed intermediate strip alternating in direction with those on the other side of such centrally disposed intermediate strip.

13. In a machine for the purpose described, two coöperating cutting rollers adapted to form in the sheet series of alternatingly interrupted cuts, such rolls comprising plain disks and notched cutters, the notched cutters arranged in coöperating pairs between a plain disk on one roll on one side and a plain disk on the other side on the other roll, such plain disks adapted to force in opposite directions from the initial plane of the sheet strips of the width equaling the plain disks and being of the same width as the width of a bar in the expanded metal; such cutters operating to sever an intervening strip of the same width from the adjacent strip on each side thereof along spaces between the keys in the metal with such intermediate strips connected at adjacent keys on one edge to one adjacent strip and on the other edge to the other adjacent strip and such connecting keys extending in parallel rows, such cutting and plain disks also alternatingly spaced in the said cutting rolls whereby alternate intermediate strips are connected to the adjacent strips forced away from the initial plane of the sheet at every other key in rows extending transversely of the direction of the cuts.

WM. H. COOLEY.

Witnesses:
 LOUISE FREY,
 OSBORNE F. GURNEY.